United States Patent
Lewis (10) Patent No.: US 8,698,832 B1
(45) Date of Patent: Apr. 15, 2014

(54) PERCEPTUAL DETAIL AND ACUTANCE ENHANCEMENT FOR DIGITAL IMAGES

(75) Inventor: Jason E. Lewis, Issaquah, WA (US)

(73) Assignee: Disney Enterprises, Inc., Burbank, CA (US)

( * ) Notice: Subject to any disclaimer, the term of this patent is extended or adjusted under 35 U.S.C. 154(b) by 918 days.

(21) Appl. No.: 12/788,105

(22) Filed: May 26, 2010

(51) Int. Cl.
*G09G 5/02* (2006.01)
*G09G 5/10* (2006.01)

(52) U.S. Cl.
USPC .......... 345/589; 345/426; 345/591; 382/172; 382/274

(58) Field of Classification Search
USPC ................. 345/426, 589, 591; 382/172, 274
See application file for complete search history.

(56) References Cited

U.S. PATENT DOCUMENTS

| | | | |
|---|---|---|---|
| 7,616,200 B1* | 11/2009 | Heinrich et al. | 345/422 |
| 2002/0001416 A1* | 1/2002 | Zhou et al. | 382/268 |
| 2007/0153025 A1* | 7/2007 | Mitchell et al. | 345/690 |
| 2009/0016635 A1* | 1/2009 | Takayama | 382/266 |
| 2009/0128584 A1* | 5/2009 | Lee et al. | 345/690 |
| 2011/0085084 A1* | 4/2011 | Jain et al. | 348/598 |
| 2011/0298839 A1* | 12/2011 | Nakanishi | 345/690 |

* cited by examiner

*Primary Examiner* — Xiao M. Wu
*Assistant Examiner* — Todd Buttram
(74) *Attorney, Agent, or Firm* — Patterson & Sheridan LLP (57) ABSTRACT

A method for increasing the perceived quality of a digital image. The method includes receiving a first luminance value associated with a pixel located at a first pixel location in the digital image; generating a second luminance value based on a random number; blending the first luminance value and the second luminance value to generate an output luminance value; and displaying on a display device at the first pixel location or storing in a memory an output pixel having a brightness based on the output luminance value.

18 Claims, 6 Drawing Sheets

PERCEPTUAL DETAIL AND ACUTANCE ENHANCEMENT FOR DIGITAL IMAGES

BACKGROUND

1. Field of the Invention

The present invention relates to the field of computer graphics and, in particular, to perceptual detail and acutance enhancement for digital images.

2. Description of the Related Art

Digital videos and/or digital images are typically associated with a particular encoding technique and/or a particular resolution. However, the quality of the digital video and/or digital image can be visually compromised as a result of poor encoding or poor video resolution. Poor video quality distracts viewers from the content and negatively impacts the viewer experience. In particular, the human eye is very sensitive to repeating patterns or geometric patterns introduced with many encoding techniques. Artifacts from high compression, low bitrates, among others, decrease visual detail and acutance. Acutance is typically related to edge contrast in a video or image. Encoding and compression also creates posterization or "flat" spots in imagery that includes smooth gradients or details with very similar shades and colors.

In addition, digital videos and/or digital images are often displayed at resolutions greater than their native resolution. For example, a small video can be played back at "full screen" resolution. Bicubic or bilinear upscaling can be used to fill in missing pixels at the higher resolution, but the "smoothing" effect introduced by these techniques causes significant blurriness, both actual and perceived. Increasing contrast, or sharpening images, to compensate for the blurriness associated with upscaling exacerbates the video degradation and brings the artifacts themselves into sharper focus. Sharpening can also create additional visual artifacts.

As the foregoing illustrates, there is a need in the art for a technique that increases perceived image quality and reduces appearance of encoding artifacts in digital videos and/or digital images.

SUMMARY

Embodiments of the invention provide techniques for increasing the perceived quality and reducing the appearance of encoding artifacts in digital videos and/or digital images. Embodiments of the invention add strategically-placed artificial detail into the digital videos and/or digital images, which the eye perceives as actual detail. The artificial detail also decreases the perception and visibility of encoding artifacts, such as macro-block chunks, flat spots, posterization, gradient banding, among others. Embodiments of the invention provide a subjectively more pleasing image to the human eye, since, at low levels, the human eye and brain have difficulty distinguishing between actual detail and artificially-introduced detail.

One embodiment of the invention provides a method for increasing the perceived quality of a digital image. The method includes receiving a first luminance value associated with a pixel located at a first pixel location in the digital image; generating a second luminance value based on a random number; blending the first luminance value and the second luminance value to generate an output luminance value; and displaying on a display device at the first pixel location or storing in a memory an output pixel having a brightness based on the output luminance value.

Advantageously, embodiments of the invention provide an effective technique for improving the perceived quality of digital images, especially digital images that exhibit encoding artifacts, such as upscaled images or highly compressed lossy encodings.

BRIEF DESCRIPTION OF THE DRAWINGS

So that the manner in which the above recited features can be understood in detail, a more particular description of embodiments of the invention, briefly summarized above, may be had by reference to the appended drawings. It is to be noted, however, that the appended drawings illustrate only typical embodiments of this invention and are therefore not to be considered limiting, for embodiments of the invention may admit to other equally effective embodiments.

DETAILED DESCRIPTION OF EXEMPLARY EMBODIMENTS

Embodiments of the invention provide techniques for increasing the perceived quality and reducing the appearance of encoding artifacts in digital videos and/or digital images. Embodiments of the invention add strategically-placed artificial detail into the digital videos and/or digital images, which the eye perceives as actual detail. The artificial detail also decreases the perception and visibility of encoding artifacts, such as macro-block chunks, flat spots, posterization, gradient banding, among others. Embodiments of the invention provide a subjectively more pleasing image to the human eye, since, at low levels, the human eye and brain have difficulty distinguishing between actual detail and artificially-introduced detail.

According to some embodiments, the artificial detail is generated by modifying individual pixel luminance values. Also, in some embodiments, the deviations are applied only to specific areas of the image based on the original luminance of the pixel. In some embodiments, more artificial detail is added into the mid-tones and less artificial detail is introduced into bright highlights and dark areas. Randomness and lack of pattern create a more natural look for the imagery. Embodiments also provide a tuneable algorithm to generate the random artificial detail.

One embodiment of the invention provides a method for increasing the perceived quality of a digital image. The method includes receiving a first luminance value associated with a pixel located at a first pixel location in the digital image; generating a second luminance value based on a random number; blending the first luminance value and the second luminance value to generate an output luminance value; and displaying on a display device at the first pixel location or storing in a memory an output pixel having a brightness based on the output luminance value.

System Overview

Figure 1:
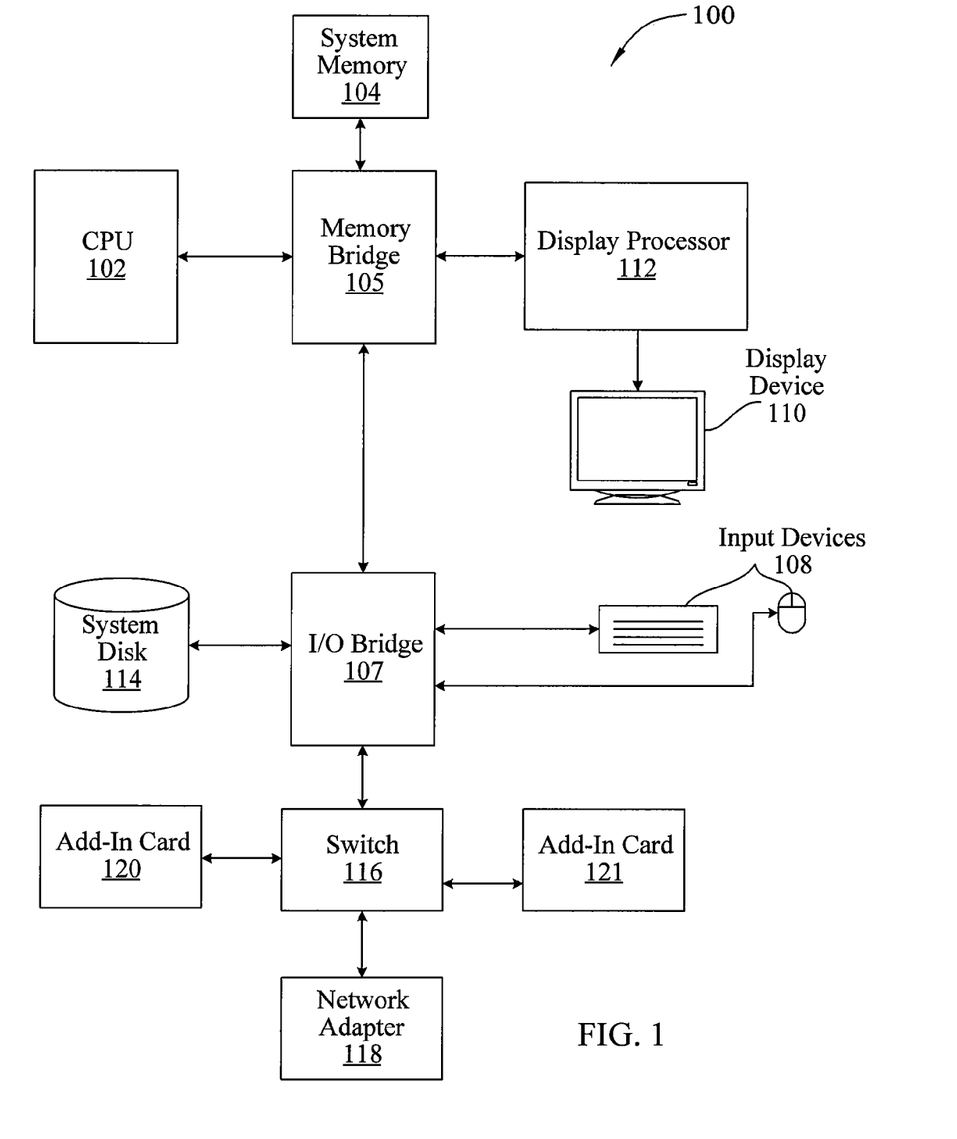
FIG. 1 is a block diagram of a system configured to implement one or more aspects of embodiments of the invention.

FIG. 1 is a block diagram of a system 100 configured to implement one or more aspects of the present invention.

System 100 may be a computer workstation, personal computer, video game console, personal digital assistant, rendering engine, mobile phone, hand held device, smart phone, super-smart phone, or any other device suitable for practicing one or more embodiments of the present invention.

As shown, system 100 includes one or more processing units, such as central processing unit (CPU) 102, and a system memory 104 communicating via a bus path that may include a memory bridge 105. CPU 102 includes one or more processing cores, and, in operation, CPU 102 is the master processor of system 100, controlling and coordinating operations of other system components. System memory 104 stores software applications and data for use by CPU 102. CPU 102 runs software applications and optionally an operating system. Memory bridge 105, which may be, e.g., a Northbridge chip, is connected via a bus or other communication path (e.g., a HyperTransport link) to an I/O (input/output) bridge 107. I/O bridge 107, which may be, e.g., a Southbridge chip, receives user input from one or more user input devices 108 (e.g., keyboard, mouse, joystick, digitizer tablets, touch pads, touch screens, still or video cameras, motion sensors, and/or microphones) and forwards the input to CPU 102 via memory bridge 105.

One or more display processors, such as display processor 112, are coupled to memory bridge 105 via a bus or other communication path (e.g., a PCI Express, Accelerated Graphics Port, or HyperTransport link); in one embodiment display processor 112 is a graphics subsystem that includes at least one graphics processing unit (GPU) and graphics memory. Graphics memory includes a display memory (e.g., a frame buffer) used for storing pixel data for each pixel of an output image. Graphics memory can be integrated in the same device as the GPU, connected as a separate device with the GPU, and/or implemented within system memory 104.

Display processor 112 periodically delivers pixels to a display device 110 (e.g., a screen or conventional CRT, plasma, OLED, SED or LCD based monitor or television). Additionally, display processor 112 may output pixels to film recorders adapted to reproduce computer generated images on photographic film. Display processor 112 can provide display device 110 with an analog or digital signal.

A system disk 114 is also connected to I/O bridge 107 and may be configured to store content and applications and data for use by CPU 102 and display processor 112. System disk 114 provides non-volatile storage for applications and data and may include fixed or removable hard disk drives, flash memory devices, and CD-ROM, DVD-ROM, Blu-ray, HD-DVD, or other magnetic, optical, or solid state storage devices.

A switch 116 provides connections between I/O bridge 107 and other components such as a network adapter 118 and various add-in cards 120 and 121. Network adapter 118 allows system 100 to communicate with other systems via an electronic communications network, and may include wired or wireless communication over local area networks and wide area networks such as the Internet.

Other components (not shown), including USB or other port connections, film recording devices, and the like, may also be connected to I/O bridge 107. For example, an audio processor may be used to generate analog or digital audio output from instructions and/or data provided by CPU 102, system memory 104, or system disk 114. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols, as is known in the art.

In one embodiment, display processor 112 incorporates circuitry optimized for graphics and video processing, including, for example, video output circuitry, and constitutes a graphics processing unit (GPU). In another embodiment, display processor 112 incorporates circuitry optimized for general purpose processing. In yet another embodiment, display processor 112 may be integrated with one or more other system elements, such as the memory bridge 105, CPU 102, and I/O bridge 107 to form a system on chip (SoC). In still further embodiments, display processor 112 is omitted and software executed by CPU 102 performs the functions of display processor 112.

Pixel data can be provided to display processor 112 directly from CPU 102. In some embodiments of the present invention, instructions and/or data representing a scene are provided to a render farm or a set of server computers, each similar to system 100, via network adapter 118 or system disk 114. The render farm generates one or more rendered images of the scene using the provided instructions and/or data. These rendered images may be stored on computer-readable media in a digital format and optionally returned to system 100 for display. Similarly, stereo image pairs processed by display processor 112 may be output to other systems for display, stored in system disk 114, or stored on computer-readable media in a digital format.

Alternatively, CPU 102 provides display processor 112 with data and/or instructions defining the desired output images, from which display processor 112 generates the pixel data of one or more output images, including characterizing and/or adjusting the offset between stereo image pairs. The data and/or instructions defining the desired output images can be stored in system memory 104 or graphics memory within display processor 112. In an embodiment, display processor 112 includes 3D rendering capabilities for generating pixel data for output images from instructions and data defining the geometry, lighting shading, texturing, motion, and/or camera parameters for a scene. Display processor 112 can further include one or more programmable execution units capable of executing shader programs, tone mapping programs, and the like.

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies display processor 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

According to embodiments of the invention, artificial detail is added into digital imagery to increase perceived quality and reduce the appearance of encoding artifacts. Certain embodiments of the invention may be implemented in software stored in system memory 104 and executed by CPU 102 and/or display processor 112. Other embodiments may be implemented as one or more shader programs executed by display processor 112. Still further embodiments may be implemented in fixed function hardware included within display processor 112. Other embodiments may be implemented as a combination of hardware and software.

Perceptual Detail Enhancement

Figure 2:
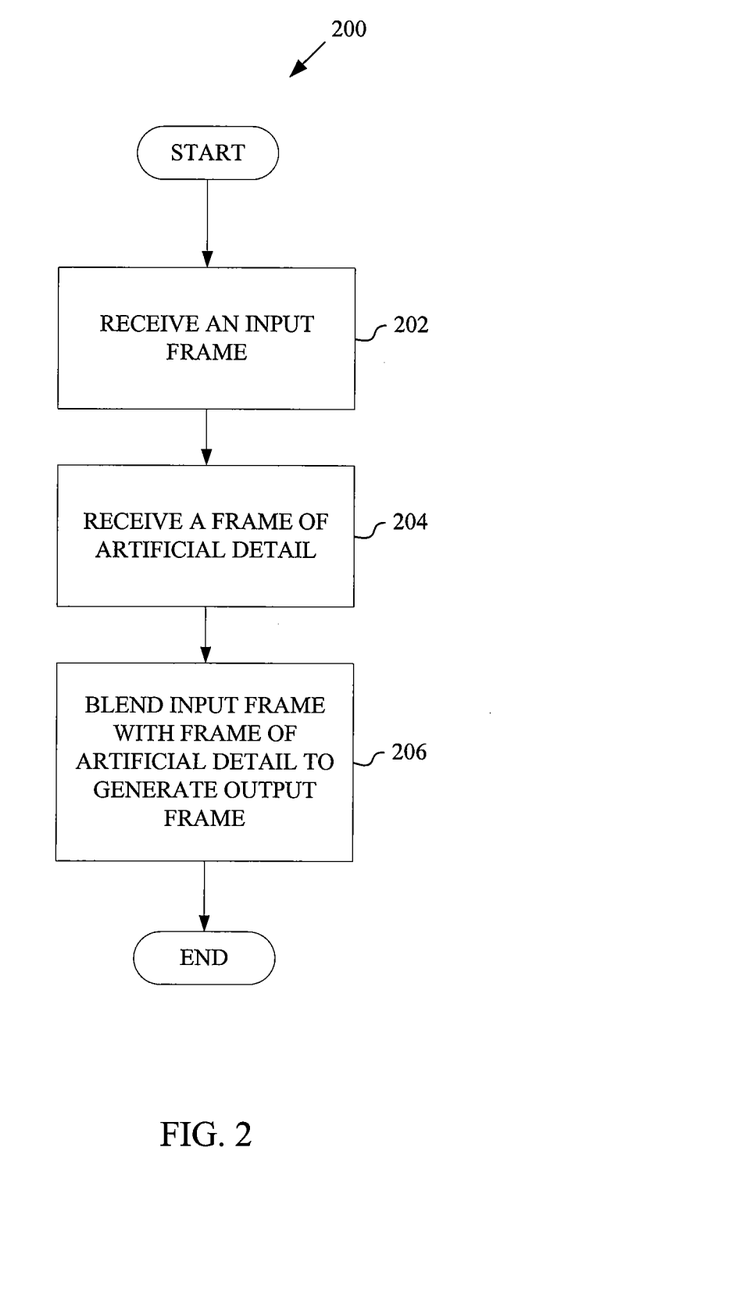
FIG. 2 is a flow diagram of method steps for perceptual detail enhancement, according to one embodiment of the invention.

FIG. 2 is a flow diagram of method steps for perceptual detail enhancement, according to one embodiment of the invention. Persons skilled in the art will understand that, even though the method 200 is described in conjunction with the systems of FIG. 1, any system configured to perform the method steps, in any order, is within the scope of embodiments of the invention.

As shown, the method 200 begins at step 202, where a processor receives an input frame. In one embodiment, the input frame is a frame of a video sequence. In other embodiments, the input frame is a single image and is not part of a video sequence. The input frame may be associated with a particular resolution, e.g., 640×480 pixels. If the input frame is displayed on a display device that provides a resolution that is higher than the resolution of the input frame, then the input frame may be scaled up to increase the size of the display image. In some cases, when the input frame is scaled up, visual artifacts are introduced into the scaled input frame. Examples of visual artifacts that may be introduced, include macro-block chunks, flat spots, posterization, gradient banding, among others. Additionally, these and other artifacts can also be introduced into the input frame based on lossy encoding or compression of the input frame, even without upscaling. Thus, embodiments of the invention provide techniques to increase the perceived quality and reduce the appearance of encoding artifacts in the input frame when displayed on a display device.

As described in greater detail herein, the processor may be included in a computer system, a video player, or any other type of computer system. For example, the video player may be a set-top box coupled to a television, such a receiver (e.g., a cable box or a satellite receiver) or a media player (e.g., CD (compact disc) player, DVD (digital versatile disc) player, or Blu-Ray disc player, or other media player), among others.

At step 204, the processor receives a frame of artificial detail. According to various embodiments, the frame of artificial detail includes, for each pixel location, randomly generated values associated with an increase or a decrease in the luminance values associated with the pixel location. In some embodiments, the frame of artificial detail is generated based on the luminance values of the pixels included in the input frame. In other embodiments, the frame of artificial detail may be pre-computed and is not based on the input frame. For example, a sequence of thirty different frames of artificial detail may be generated. As described in greater detail herein, the pre-computed sequence may then be sequentially overlaid and blended with the original source video. Pre-computing the frames of artificial detail, in some embodiments, decreases the computing power required to achieve the desired effect on video imagery displayed at high resolutions. Additional details associated with generating the frame of artificial detail are described in FIG. 3.

At step 206, the processor blends the input frame with the frame of artificial detail to generate an output frame. In one embodiment, a blend weight may be associated with each pixel location in the frame of artificial detail so that the amount of modification of each pixel in the input frame is based on the blend weight. For example, the brightest pixels, having a luminance value close the maximum luminance value, and the darkest pixels, having a luminance value close the minimum luminance value, may be less affected than mid-range pixels. Accordingly, the blend weight associated with the pixel locations with the brightest pixels and the darkest pixels in the input frame may be less than the blend weight for mid-range pixels.

In some embodiments, the artificial detail is added to the input image without changing the overall brightness or darkness of the input image. Additionally, overall contrast is maintained. These features may be achieved, in some embodiments, since the number of pixels that are associated with an increase in luminance is approximately the same as the number of pixels that are associated with a decrease in luminance. In one embodiment, there is no constraint that requires that the same number of pixels has an increase/decrease in luminance, but, rather, the effect is achieved based on the random values of the artificial detail. In other embodiments, specific constraints may be included in the techniques described herein to require that the overall brightness or darkness of the input image remains the same. Also, in some embodiments, the total deviation or strength of the artificial detail that is added to the input image is approximately equal in both the positive and negative direction from the original pixel luminance values, causing the overall brightness to remain the same. Additional details associated with blending the input frame with the frame of artificial detail are described in FIG. 4.

Figure 3:
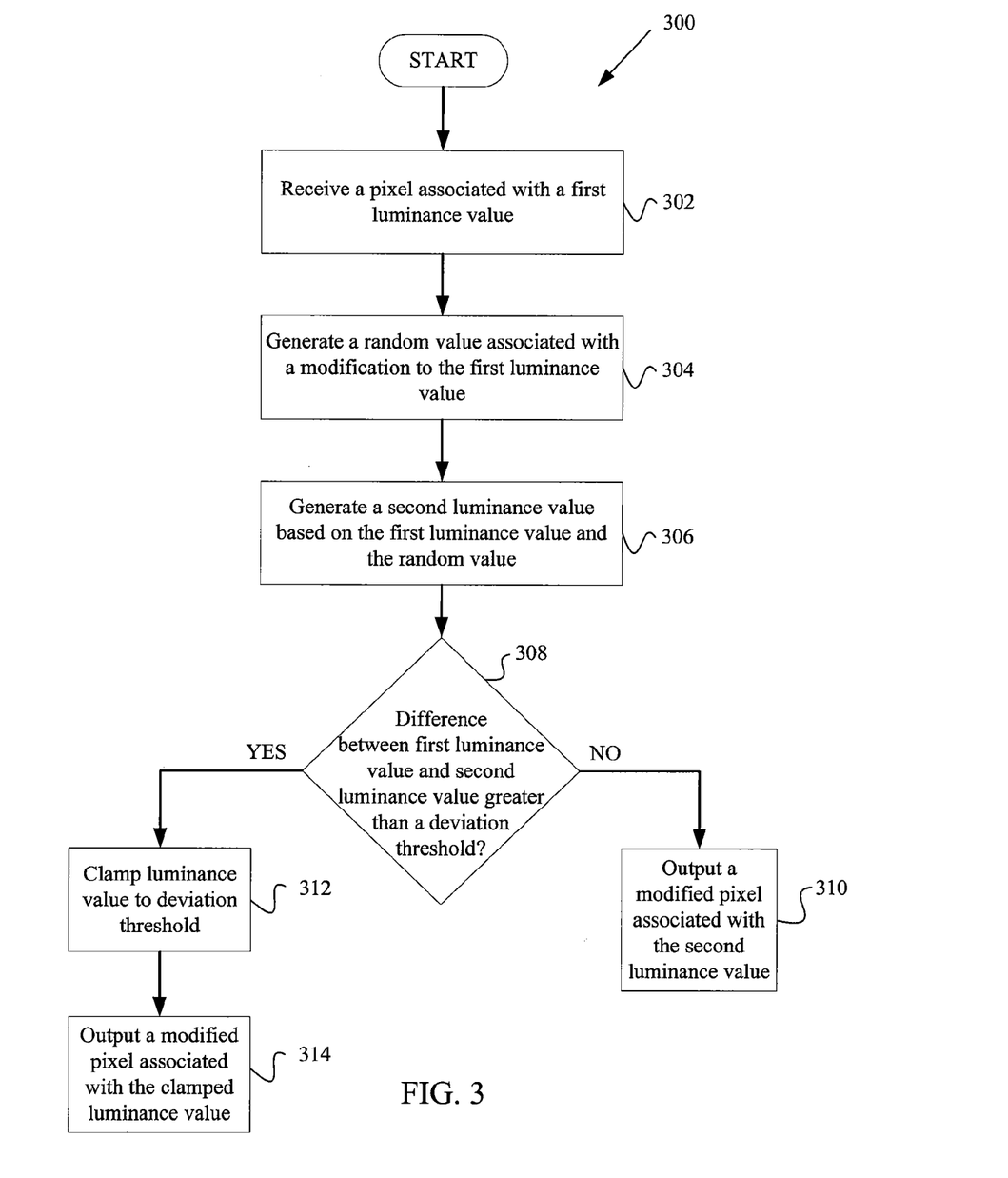
FIG. 3 is a flow diagram of method steps for generating a frame of artificial detail, according to one embodiment of the invention.

FIG. 3 is a flow diagram of method steps for generating a frame of artificial detail, according to one embodiment of the invention. Persons skilled in the art will understand that, even though the method 300 is described in conjunction with the systems of FIG. 1, any system configured to perform the method steps, in any order, is within the scope of embodiments of the invention.

As shown, the method 300 begins at step 302, where a processor receives a pixel associated with a first luminance value. In one embodiment, the pixel is associated with a pixel location in a digital image. In some embodiments, the digital image is part of a sequence of digital images, such as a video sequence. Each pixel in the digital image is associated with a luminance value associated with the brightness of the pixel. In some embodiments, the luminance value of the first pixel can be calculated based on one or more chrominance values associated with the pixel.

At step 304, the processor generates a random value associated with a modification to the first luminance value. As described herein, randomly generated perceptual detail may be added to the digital image to enhance the visual quality of the digital image. In some embodiments, a seed value is provided that is input into a random number generator to generate the random value. In some embodiments, the random value is limited to a range of random values, e.g., 0 to 100. For example, when the random value falls in the range of 0 to 49, the random value may be associated with lowering the luminance value of the pixel or darkening the pixel, and when the random value falls in the range of 50 and 100, the random value may be associated with increasing the luminance value of the pixel or brightening the pixel. Also, in some embodiments, the seed value may be based on the x- and y-coordinate locations of the particular pixel.

At step 306, the processor generates a second luminance value based on the first luminance value and the random value. In some embodiments, the initially "darker" pixels become lighter and the initially "lighter" pixels become darker.

In some embodiments, the difference between the second luminance value and the first luminance value is not as large when the first luminance value is near the ends of the luminance spectrum. For example, if a pixel is either very bright or very dark, then the difference between the original pixel luminance (i.e., the first luminance value) and the modified pixel luminance (i.e., the second luminance value) is small; whereas, if a pixel is in the mid-range of luminance, then the modified pixel luminance can vary by a greater amount based on the random value. This ensures that the darkest blacks and the brightest whites are not changed significantly, which would likely add visual artifacts to the modified image.

At step 308, the processor determines whether the difference between the first luminance value and the second luminance value is greater than a deviation threshold. In some embodiments, a deviation threshold may be implemented so that the difference between the second luminance value and the first luminance value is not so large that visual artifacts are introduced, thereby degrading the perceptual quality of the image.

If, at step 308, the processor determines that the difference between the first luminance value and the second luminance value is not greater than the deviation threshold, then the method 300 proceeds to step 310. For example, pixel luminance may be based on a scale of 0 to 255. A first pixel may have an original luminance value of 100, and the deviation threshold may be 25 luminance units. In one example, based on the random number generated at step 304, the luminance should be decreased from 100 to 90, a decrease of 10 luminance units. The decrease of 10 luminance units is within the 25-unit deviation threshold.

At step 310, the processor outputs a modified pixel associated with the second luminance value. In the example outlined above, the modified pixel would be associated with a luminance value of 90.

If, at step 308, the processor determines that the difference between the first luminance value and the second luminance value is greater than the deviation threshold, then the method 300 proceeds to step 312. At step 312, the processor clamps the luminance value to the deviation threshold. For example, pixel luminance may be based on a scale of 0 to 255. A first pixel may have an original luminance value of 100, and the deviation threshold may be 25 luminance units. In one example, based on the random number generated at step 304, the luminance should be decreased from 100 to 40, a decrease of 60 luminance units. However, since the deviation threshold is 25 luminance units, the luminance is only decreased by 25 units from 100 to 75. This "clamping" is also applied in the positive direction, thereby limiting the luminance of the pixel in this example to be increased to a maximum of 125 luminance units.

At step 314, the processor outputs a modified pixel associated with the clamped luminance value. In the example outlined above, the modified pixel would be associated with a luminance value of 75.

As described herein, each pixel location is evaluated individually and the resultant output pixel at that pixel location is not based on any other pixels. According to some embodiments, the method 300 described in FIG. 3 can be repeated for each pixel location in a digital image to generate a frame of artificial detail. The frame of artificial detail can then be blended with the original frame, as described in greater detail in FIG. 4.

In some embodiments, the random values generated at step 304 and the second luminance values generated at step 306 are generated dynamically for each pixel and depend on the luminance values a particular pixel. In other embodiments, the random values and the second luminance values are precomputed and are not based on the individual pixel values in a particular frame. Also, in some embodiments, the various steps described in FIG. 3 are user-configurable. For example, the deviation threshold may be modified to allow from larger deviations in the original luminance value of a particular pixel.

Figure 4:
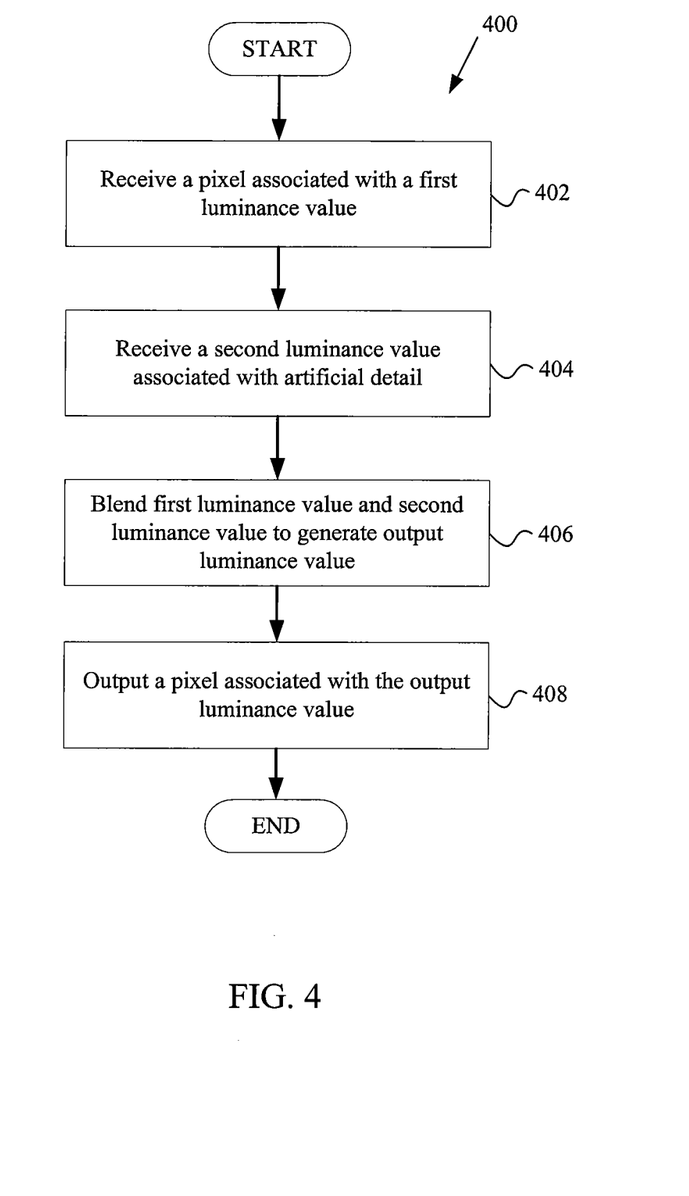
FIG. 4 is a flow diagram of method steps for blending a video frame with a frame of artificial detail, according to one embodiment of the invention.

FIG. 4 is a flow diagram of method steps for blending a video frame with a frame of artificial detail, according to one embodiment of the invention. Persons skilled in the art will understand that, even though the method 400 is described in conjunction with the systems of FIG. 1, any system configured to perform the method steps, in any order, is within the scope of embodiments of the invention.

As shown, the method 400 begins at step 402, where a processor receives a pixel associated with a first luminance value. As described herein, the pixel may be included in a digital image. The digital image may be part of a video sequence, i.e., a video frame. The first luminance value is associated with the "original" luminance value at a particular pixel location.

At step 404, the processor receives a second luminance value associated with artificial detail. In one embodiment, the second luminance value associated with the artificial detail is generated using the techniques described in FIG. 3. In other embodiments, the second luminance value may be generated using any technically feasible manner.

At step 406, the processor blends the first luminance value and the second luminance value to generate an output luminance value. In one embodiment, blending the first luminance value and the second luminance value comprises taking the average of the first luminance value and the second luminance value. In other embodiments, blending the first luminance value and the second luminance value is based on the brightness/darkness of the original pixel, i.e., is based on the first luminance value. In some embodiments, when the first luminance value is near either end of the luminance spectrum (either bright or dark), a smaller blend weight associated with the second luminance value is used. Thus, the artificial detail associated with the second luminance value does not influence the outcome of the blending operation as much as in mid-range pixels.

At step 408, the processor outputs a pixel associated with the output luminance value. The method 400 can be repeated for each pixel included in the digital image to generate an output frame. The output frame can then be displayed on a display device or stored in a memory, such as a frame buffer, for future display.

Figure 5A:
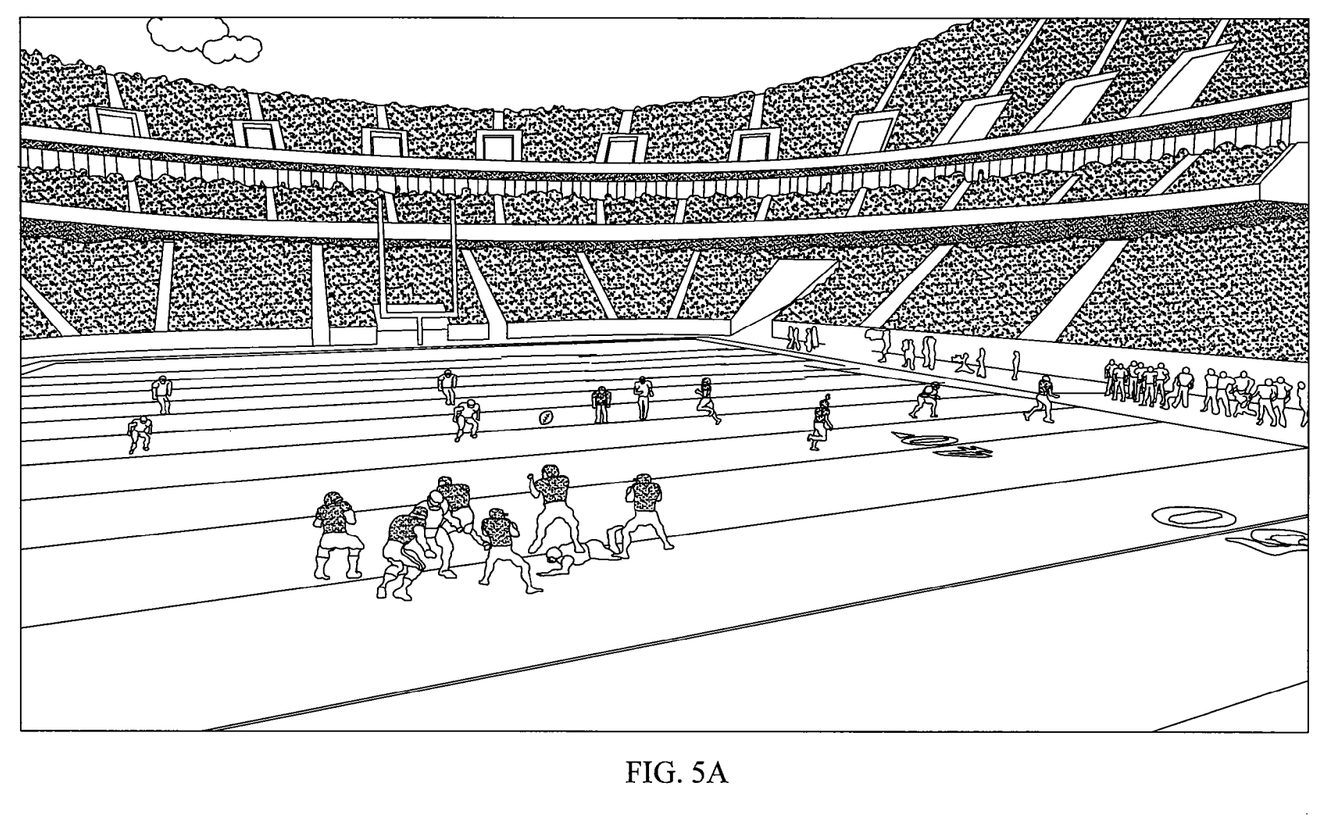
FIGS. 5A-5B are screenshots illustrating perceptual detail enhancement, according to embodiments of the invention.
Figure 5B:
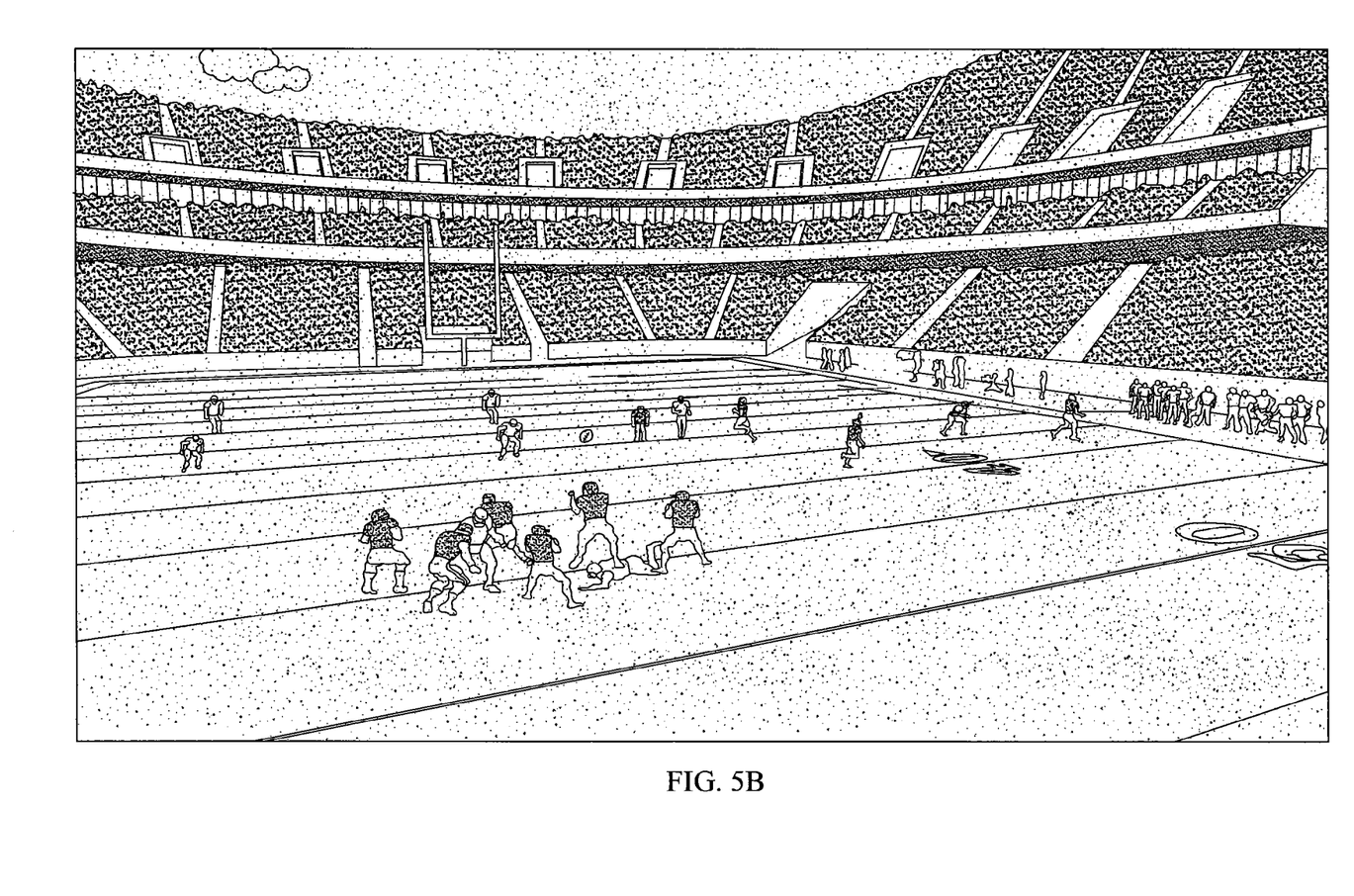

FIGS. 5A-5B are screenshots illustrating perceptual detail enhancement, according to embodiments of the invention. FIG. 5A illustrates a video frame associated with football game, where a quarterback is passing a ball to a receiver. In one embodiment, the screenshot shown in FIG. 5A is associated with displaying the video in a "full-screen" mode. However, the video may have a native resolution that is less than the full-screen resolution of the display. Thus, the video is upsampled when displayed in full-screen mode. As described herein, the upsampled video may exhibit visual artifacts, such as macro-block chunks, flat spots, posterization, gradient banding, among others.

FIG. 5B illustrates the video frame with artificial detail added, according to one embodiment of the invention. As shown, random detail has been added to the video frame. As described above in FIGS. 2-4, the artificial detail is added by randomly increasing or decreasing the luminance of each pixel in the video frame. As also described, in some embodiments, the artificial detail to be added/subtracted to a particular pixel is based on a randomly generated value, clamped to fall within a deviation threshold of the original pixel luminance value. Also, in some embodiments, the artificial detail is blended with the original luminance value based, in part, on the original luminance value. Thus, in some embodiments, the very bright and very dark pixel do not have much (or possibly any) artificial detail added; whereas pixels in the mid-range of luminance have more random artificial detail blended in.

In some embodiments, the techniques described herein are applied directly to the digital video or digital image decoding algorithms used to decompress and display digital videos and/or digital images. In such cases, no additional client side image processing would be necessary within the target display application or device to achieve the desired effect. Also, in other embodiments, decompression algorithms may directly incorporate these techniques in client side processing, such as in a media player.

In another embodiment, the ratio of artificial detail pixels generated to actual source pixels can be increased. This feature can be achieved by upscaling a source image to a higher resolution and then applying the techniques described herein to add perceptual detail. By applying embodiments of the invention at a 1:1 ratio to actual display device pixels, i.e., one pixel of artificial detail is generated for each pixel of resolution available on the display device, a larger ratio of artificial detail pixels generated to actual source pixels is achieved. In this manner, a single original source image pixel that has been stretched to fill a large area of display device pixels can be injected with many smaller artificial detail pixels. Increasing the ratio of artificial detail pixels to actual source pixels could also be achieved by generating detail on a sub-pixel level and applying the invention to imagery displayed at its native resolution.

Another embodiment of this invention involves stepped scaling and multiple applications of very subtle artificial detail. For example, artificial detail can be applied at each of a plurality of upscaling stages. For example, an image can be scaled up 200 percent from its original resolution and then injected with artificial detail using the techniques described herein. The resultant output can then be upscaled again with more artificial detail added. The process can be repeated indefinitely until a target resolution has been reached. This embodiment generates and mixes artificial detail of multiple sizes and pixel ratios into the imagery, rather than generating the artificial detail at a single ratio.

Another embodiment of this invention involves obtaining the original pixel luminance value based on a particular chrominance channel or weighted mix of chrominance channels for that particular pixel.

Another embodiment of this invention involves performing a weighted blend of the original and artificial pixels based upon chrominance values of the original pixels. For example this would enable blending artificial detail pixels with 'green' chrominance pixels in a manner such that the invention predominantly applies to the green grass of a sports field, but not the blue sky.

Another embodiment of this invention involves generating artificial detail with deviations from an original pixel's chrominance (color or hue) values instead of only deviating the luminance values. When artificial detail is blended with the original pixel values, either chrominance, luminance, or both could be deviated. As with previous embodiments deviations could be clamped at specific ranges to optimize the shifts in luminance or chrominance.

In essence the embodiments focused purely on luminance value manipulation can be considered to be generating monochromatic artificial detail. Those treating chrominance channels independently or in augmentation to luminance values have the capability of generating chromatic detail or blends.

In still further embodiments, the techniques described herein may be implemented for groups of pixels. In some embodiments, an M×N block of pixels may be examined for similarity. If a similarity value associated with block of pixels exceeds a threshold value (e.g., a certain percentage of the pixels in the block of pixels have luminance and/or chrominance values within a particular range), then more artificial detail may be injected in the block of pixels. For example, if a block of pixels is mostly the same or similar in color and with similar luminance, then more artificial detail (i.e., using a larger weighting value) may be injected to into the block of pixels. However, if another block of pixels includes pixels having varying colors and/or varying luminance values, then less artificial detail may be injected. This technique may counteract any smoothing or "flat spots" in an image. In some embodiments, although the block of pixels is examined as a whole, each individual pixel may have artificial detail injected using the techniques described herein.

In sum, embodiments of the invention provide techniques for increasing the perceived quality and reducing the appearance of encoding artifacts in digital videos and/or digital images. Embodiments of the invention add strategically-placed artificial detail into the digital videos and/or digital images, which the eye perceives as actual detail. The artificial detail also decreases the perception and visibility of encoding artifacts, such as macro-block chunks, flat spots, posterization, gradient banding, among others. Embodiments of the invention provide a subjectively more pleasing image to the human eye, since, at low levels, the human eye and brain have difficulty distinguishing between actual detail and artificially-introduced detail.

Advantageously, embodiments of the invention provide an effective technique for improving the perceived quality of digital images, especially digital images that exhibit encoding artifacts, such as upscaled images.

Various embodiments of the present invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored.

The invention has been described above with reference to specific embodiments and numerous specific details are set forth to provide a more thorough understanding of the invention. Persons skilled in the art, however, will understand that various modifications and changes may be made thereto without departing from the broader spirit and scope of the invention as set forth in the appended claims. The foregoing description and drawings are, accordingly, to be regarded in an illustrative rather than a restrictive sense.

What is claimed is:
1. A method for increasing the perceived quality of a digital image, the method comprising:
receiving a first luminance value associated with a pixel located at a first pixel location in the digital image;
generating a second luminance value based on the first luminance value and a random number;

upon determining that a difference between the first luminance value and the second luminance value is greater than a deviation threshold, generating a third luminance value equal to the deviation threshold;

blending the first luminance value and the third luminance value to generate an output luminance value; and displaying on a display device at the first pixel location or storing in a memory an output pixel having a brightness based on the output luminance value.

2. The method according to claim 1, wherein the steps of receiving the first luminance value, generating the second luminance value, generating the third luminance value, and blending the first luminance value and the third luminance value are repeated for each pixel location in the digital image.

3. The method according to claim 1, wherein the pixel is included in a group of pixels associated with a weight value corresponding to a similarity characteristic of the pixels included in the group of pixels.

4. The method according to claim 1, wherein the first pixel location in the digital image is defined by a two-dimensional coordinate, and further comprising the step of generating the random number based on the two-dimensional coordinate.

5. The method according to claim 1, wherein a weight associated with the second luminance value in the blending step is based on the first luminance value.

6. The method according to claim 5, wherein the weight is larger when the first luminance value resides within the middle of a luminance spectrum than when the first luminance value resides at either end of the luminance spectrum.

7. The method according to claim 1, wherein the difference between the output luminance value and the first luminance value is perceived as artificial detail.

8. The method according to claim 1, wherein the digital image is included in a sequence of images that comprise a digital video.

9. A non-transitory computer-readable storage medium, storing instructions that when executed by a processor, cause a processor to increase the perceived quality of a digital image, by performing the steps of:

receiving a first luminance value associated with a pixel located at a first pixel location in the digital image;

generating a second luminance value based on the first luminance value and a random number;

upon determining that a difference between the first luminance value and the second luminance value is greater than a deviation threshold, generating a third luminance value equal to the deviation threshold;

blending the first luminance value and the second third luminance value to generate an output luminance value; and displaying on a display device at the first pixel location or storing in a memory an output pixel having a brightness based on the output luminance value.

10. The computer-readable storage medium according to claim 9, wherein the steps of receiving the first luminance value, generating the second luminance value, generating the third luminance value, and blending the first luminance value and the third luminance value are repeated for each pixel location in the digital image.

11. The computer-readable storage medium according to claim 9, wherein the first pixel location in the digital image is defined by a two-dimensional coordinate, and further comprising the step of generating the random number based on the two-dimensional coordinate.

12. The computer-readable storage medium according to claim 9, wherein a weight associated with the second luminance value in the blending step is based on the first luminance value.

13. The computer-readable storage medium according to claim 12, wherein the weight is larger when the first luminance value resides within the middle of a luminance spectrum than when the first luminance value resides at either end of the luminance spectrum.

14. The computer-readable storage medium according to claim 10, wherein the difference between the output luminance value and the first luminance value is perceived as artificial detail.

15. The computer-readable storage medium according to claim 9, wherein the digital image is included in a sequence of images that comprise a digital video.

16. A system for increasing the perceived quality of a digital image, the system comprising:

a processor configured to:

receiving a first luminance value associated with a pixel located at a first pixel location in the digital image;

generating a second luminance value based on the first luminance value and a random number;

upon determining that a difference between the first luminance value and the second luminance value is greater than a deviation threshold, generating a third luminance value equal to the deviation threshold;

blending the first luminance value and the third luminance value to generate an output luminance value; and displaying on a display device at the first pixel location or storing in a memory an output pixel having a brightness based on the output luminance value.

17. The system of claim 16, further comprising another memory storing instructions that, when executed by the processor, configure the processor to:

receive the first luminance value;

generate the second luminance value;

blend the first luminance value and the second luminance value; and display on the display device or storing in the memory the output pixel.

18. A method for increasing the perceived quality of a digital image, the method comprising:

receiving a first chrominance value associated with a pixel located at a first pixel location in the digital image;

generating a second chrominance value based on the first chrominance value and a random number;

upon determining that a different between the first chrominance value and the second chrominance value is greater than a deviation threshold, generating a third chrominance value equal to the deviation threshold;

blending the first chrominance value and the third chrominance value to generate an output chrominance value; and displaying on a display device at the first pixel location or storing in a memory an output pixel having a color based on the output chrominance value.

* * * * *

UNITED STATES PATENT AND TRADEMARK OFFICE
CERTIFICATE OF CORRECTION

PATENT NO.        : 8,698,832 B1
APPLICATION NO.   : 12/788105
DATED             : April 15, 2014
INVENTOR(S)       : Jason E. Lewis Page 1 of 1

It is certified that error appears in the above-identified patent and that said Letters Patent is hereby corrected as shown below:

In the Claims:

Column 11, Claim 9, Line 48, please delete "second".

Signed and Sealed this
First Day of July, 2014

Michelle K. Lee
*Deputy Director of the United States Patent and Trademark Office*